United States Patent
Peters

Patent Number: 6,122,407
Date of Patent: Sep. 19, 2000

[54] METHOD AND APPARATUS FOR PRODUCING THRESHOLD ARRAYS USING VARIANCE MINIMIZATION AND SPARSE IMAGE CALCULATIONS

[75] Inventor: Michael Alan Peters, Santa Clara, Calif.

[73] Assignee: Electronics for Imaging, Inc., Foster City, Calif.

[21] Appl. No.: 08/995,287

[22] Filed: Dec. 19, 1997

[51] Int. Cl.[7] .............................. G06K 9/38; H04N 1/40
[52] U.S. Cl. ..................... 382/270; 382/272; 358/455; 358/457
[58] Field of Search ............................. 382/237, 270, 382/272, 281; 358/455, 456, 457

[56] References Cited

U.S. PATENT DOCUMENTS

| | | | |
|---|---|---|---|
| 5,111,310 | 5/1992 | Parker et al. | 358/456 |
| 5,526,438 | 6/1996 | Barton | 382/237 |
| 5,708,518 | 1/1998 | Parker et al. | 358/534 |
| 5,726,772 | 3/1998 | Parker et al. | 358/456 |

FOREIGN PATENT DOCUMENTS

| | | | |
|---|---|---|---|
| 0560285 | 9/1993 | European Pat. Off. | H04N 1/40 |
| 0762734 | 3/1997 | European Pat. Off. | H04N 1/405 |

*Primary Examiner*—Thomas D. Lee
*Attorney, Agent, or Firm*—Michael A. Glenn

[57] ABSTRACT

A method and apparatus for creating threshold arrays having a minimized gray scale variance without geometric artifacts. The invention comprises the steps of processing each candidate pixel in the threshold array using a variance minimization technique and applying a sparse image calculation on the same pixel. The preferred embodiment of the invention comprises the application of a variance minimization technique on a threshold array. The threshold array is analyzed on a pixel-by-pixel basis. Each candidate pixel that is to be turned on is examined in relation to the previous pixels that already exist. The candidate pixel is examined to determine its effect on the variance of the smoothed gray level determined by the convolution of the pixel pattern with a smoothing kernel. The candidate pixel is also examined in relation to the distribution of the angles it forms with the previously selected pixels. The preferred embodiment uses a variant of the combinatorial Hough transform. In the preferred embodiment, there is an accumulator array for each not yet selected pixel that has a location for each of a quantified set of angles. A sum is stored in this location based on those previously selected pixels which make an angle with the not yet selected pixel which is discretized to the angle corresponding to that location. The effect of the true angle may be distributed over more than one location of the accumulator array and may depend on distance and angle. It is desired that a pixel is selected which combines a low variance of the smoothed gray level with a favorable distribution of values in its angle accumulator array. This process is repeated until all the pixels in the threshold array have been selected.

18 Claims, 5 Drawing Sheets

METHOD AND APPARATUS FOR PRODUCING THRESHOLD ARRAYS USING VARIANCE MINIMIZATION AND SPARSE IMAGE CALCULATIONS

BACKGROUND OF THE INVENTION

1. Technical Field

The invention relates to digital halftoning. More particularly, the invention relates to the production of threshold arrays in the digital halftoning process using filtering and sparse image techniques, resulting in minimal gray scale variance and geometric artifacts.

2. Description of the Prior Art

Threshold arrays are an important component in displaying or printing digital image data. The digital image data must be transformed or processed so that computer display terminals with various grey level capacities, laser printers, dot matrix printers and inkjet printers, many having different resolutions and aspect ratios, all render an image represented by the image data in a similar way. An image processor associated with or configured for each such output device transforms the digital data to a form tailored to the characteristics of that particular device.

Digital halftoning is a key function of such a processor. Halftoning is the process that approximates continuous tone colors (or gray scale) by a pattern of pixels that can achieve only a limited number of discrete colors or gray levels. The most familiar case of this is the rendering of gray tones with black and white pixels.

There are two classes of ordered dither halftoning techniques known in the art. They are clustered-dot and dispersed-dot ordered dithering. Clustered-dot ordered dithering uses variable-size halftone dots at a fixed spacing. The addition of device pixels at a dot's outer edge increases the covered area and the size of the dot. When viewed from a distance, the larger the dot size, the greater the area covered and the darker the image area. Dispersed-dot ordered dithering is preferred when the display device is capable of displaying an isolated black or white pixel. It uses a fixed-size, smaller dot at variable spacing to achieve the same effect as clustered-dot ordered dithering. Variation in dot spacing varies the number of dots in a given area, or dot frequency. In such technique, a denser dot distribution provides a darker image area. On some display devices, each dot comprises up to four or five device pixels. Dispersed-dot ordering provides a dot distribution based upon the shade variations in the original image. The dot distribution is optimized to be the best representation possible for the particular display device.

Ordered dithering is generally implemented using a threshold array, also known as a dither matrix. Typically, each element in the threshold array represents a dither threshold value and is mapped through a Cartesian coordinate system to pixel locations on the continuous tone original and on the output medium. Ordered dither algorithms generate binary halftone images by comparing reflected light from pixels of an original continuous tone image to corresponding threshold values stored as elements in the threshold array.

A threshold array is used to directly control the individual pixels in a halftone image. A threshold array is much like a sampled image because it is a rectangular array of pixel values. However, it is defined entirely in device space, and the sampled values typically occupy 8 bits each. Each element within the threshold array is assigned a threshold value which represents the tonal value at which the pixel is turned on. When deciding whether to turn the pixel on, an image processor checks the pixel's location in the halftone image, determines the tonal value of the image at that exact location, and compares this tonal value with the pixel's threshold value in the threshold array. If the tonal value exceeds the threshold value, the pixel is turned on when the image is created by the imaging system. The effect of the distribution of black and white over the display image is integrated by the human eye as gray.

It would require a very large memory to store the threshold array for a screen large enough to be superimposed on an entire original image. Therefore, it is not uncommon for a threshold array to be replicated and tiled over the entire device space. Each pixel of device space is mapped to a particular element of the threshold array. Only one copy of the threshold array need be stored. Threshold values stored in this fashion are usually mapped to pixel locations on the continuous tone original through a Cartesian coordinate system, modulo the dimensions of the repeating array.

Halftoning with a particular homogeneous threshold array has become known as a "Bayer matrix." A Bayer matrix is an optimally homogeneous ordered threshold array. The goal in generating a threshold array is to order the samples so that, as each successive position or point is turned on, the total two-dimensional ensemble of "on" points remains as homogeneously arranged as possible for each gray level to be simulated. However, the homogeneous arrangement of a Bayer matrix creates a regular geometric pattern that is visible in the display image.

U.S. Pat. No. 5,317,418 issued to Lin on May 31, 1994, is a method for generating a halftone image from a gray scale image by means of a dither matrix. The matrix contains many patterns, each of which represent one gray level of the gray scale image. A positive filter is used to create the patterns in the matrix. The value of each pixel in the gray scale image is compared to the value of an element in the dither matrix, as described above.

Threshold arrays are also used in U.S. Pat. No. 5,542,029 issued to Karlsson on Jul. 30, 1996. The method involves the uses of overlapping threshold arrays rather than tiled threshold arrays to reduce the required size of the repeating threshold array.

Dispersed-dot ordered dithering presents problems, however, in that the amount of gray within an original image is not maintained over an area, i.e. the error arising from the difference between the threshold value and the actual gray level value at any particular cell is simply thrown away. This results in a loss of image information. Halftoning also introduces patterns, anomalies, or coarse quantization artifacts which are visible in the image areas where the scene has little variation (also known as banding).

A technique known as error diffusion is used in the art and makes implicit use of an eye model. It shapes the noise, i.e. the difference between the gray scale image and the halftone image, so that it is not visible by the eye. The error diffusion technique produces noise with most of the noise energy concentrated in the high frequencies, i.e., so-called blue noise. Thus, it minimizes the low-frequency artifacts. However, since error diffusion does not make explicit use of the eye model, it is not easy to adjust when the eye filter changes, for example, with printer resolution or viewer distance. It does accomplish good resolution by spreading the dots.

An example of blue noise masking techniques is demonstrated by U.S. Pat. No. 5,543,941 issued to Parker et al. on Aug. 6, 1996. It describes a technique for rendering a halftone image of a gray scale image by utilizing a pixel-by-pixel comparison of the gray scale image against a blue noise mask. The gray scale image is scanned in on a pixel-by-pixel basis and compared on a pixel-by-pixel basis to an array of corresponding data points contained in a blue noise mask stored in an array in PROM or computer memory to produce the desired halftone image.

U.S. Pat. No. 4,339,774 issued to Temple on Jul. 13, 1982, implements error diffusion in generating a dispersed dot halftone image from a continuous tone input image. Error diffusion is also used in U.S. Pat. No. 5,321,525 issued to Hains on Jul. 14, 1994, to create well-formed printable dots in a clustered dot halftone image.

Eye modeling is used to create a diagonal correlation dither matrix in U.S. Pat. No. 5,526,438 issued to Barton on Jun. 11, 1996. The matrix forces diagonal correlation of adjacent dots in the output image. The desired result is a masking of any artifacts through the favoring of diagonal pixels over horizontal or vertical pixels in an effort to produce visually unobtrusive output dot patterns.

In the same manner, U.S. Pat. No. 5,124,803 issued to Troxel on Jun. 23, 1992, uses angled, overlapping screen tiles to create a halftone image. The angled screen tile boundaries are generated in response to selected integers which, together with the number of screen dots along a side of the tile in the direction of screen pitch measurement, determine the limit of the magnitude of screen angle error. This method minimizes moire patterning in the resulting digital halftone color image.

U.S. Pat. No. 5,422,742 issued to Ostromoukhov et al. on Jun. 6, 1995, is a method and apparatus for automatic high-speed generation of digital angled halftone screens. A scanning dither array is introduced which is used for obtaining screens approximating the irrational angles which are generally required by high-quality color reproduction. The method enables color separations to be generated which minimize moire effects, interferences, and artifacts.

Error diffusion and an eye model are utilized in U.S. Pat. No. 5,469,268 issued to Neuhoff et al. on Nov. 21, 1995, to create a halftone image corresponding to gray scale input image. An optimized halftone image is produced by finding the binary image that causes a combination of printer and visual models to match the output of the visual model in response to the original gray scale image.

The aforementioned prior art methods attempt to mask the presence of artifacts in the resulting halftone display image. However the actual artifacts are still present, but may be less evident to the human eye at certain distances or resolutions. Nevertheless, the artifacts still exist. It would be highly desirable to be able to create a halftone image without the presence of artifacts.

SUMMARY OF THE INVENTION

The invention provides a method and apparatus for creating threshold arrays having a minimized gray scale variance without geometric artifacts. The invention comprises the steps of processing each candidate pixel in the threshold array using a variance minimization technique and applying a pixel angle calculation on the same pixel.

The preferred embodiment of the invention comprises the application of a variance minimization technique on a threshold array. The threshold array is analyzed on a pixel-by-pixel basis. Each candidate pixel that is to be turned on is examined in relation to the previous pixels that already exist. The candidate pixel is examined to determine its effect on the variance of the smoothed gray level determined by the convolution of the pixel pattern with a smoothing kernel. The candidate pixel is also examined in relation to the distribution of the angles it forms with the previously selected pixels. The preferred embodiment uses a variant of the combinatorial Hough transform.

In the preferred embodiment, there is an accumulator array for each not yet selected pixel that has a location for each of a quantized set of angles. A sum is stored in this location based on those previously selected pixels which make an angle with the not yet selected pixel which is discretized to the angle corresponding to that location. The effect of the true angle may be distributed over more than one location of the accumulator array and may depend on distance and angle. It is desired that a pixel is selected which combines a low variance of the smoothed gray level with a favorable distribution of values in its angle accumulator array. This process is repeated until all the pixels in the threshold array have been selected.

DETAILED DESCRIPTION OF THE INVENTION

The invention provides a method and apparatus for creating threshold arrays having a minimized gray scale variance without geometric artifacts. The invention comprises the steps of processing each candidate pixel in the threshold array using a variance minimization technique and applying a pixel angle calculation on the same pixel.

The preferred embodiment of the invention comprises the application of a variance minimization technique on a threshold array. The threshold array is analyzed on a pixel-by-pixel basis. Each candidate pixel that is to be turned on is examined in relation to the previous pixels that already exist. The candidate pixel is examined to determine its effect on the variance of the smoothed gray level determined by the convolution of the pixel pattern with a smoothing kernel. The candidate pixel is also examined in relation to the distribution of the angles it forms with the previously selected pixels. The preferred embodiment uses a variance of the combinatorial Hough transform.

In the preferred embodiment, there is an accumulator array for each not yet selected pixel that has a location for each of a quantized set of angles. A sum is stored in this location based on those previously selected pixels which make an angle with the not yet selected pixel which is discretized to the angle corresponding to that location. The effect of the true angle may be distributed over more than one location of the accumulator array and may depend on distance and angle. It is desired that a pixel is selected which combines a low variance of the smoothed gray level with a favorable distribution of values in its angle accumulator array. This process is repeated until all the pixels in the threshold array have been selected.

Figure 1:
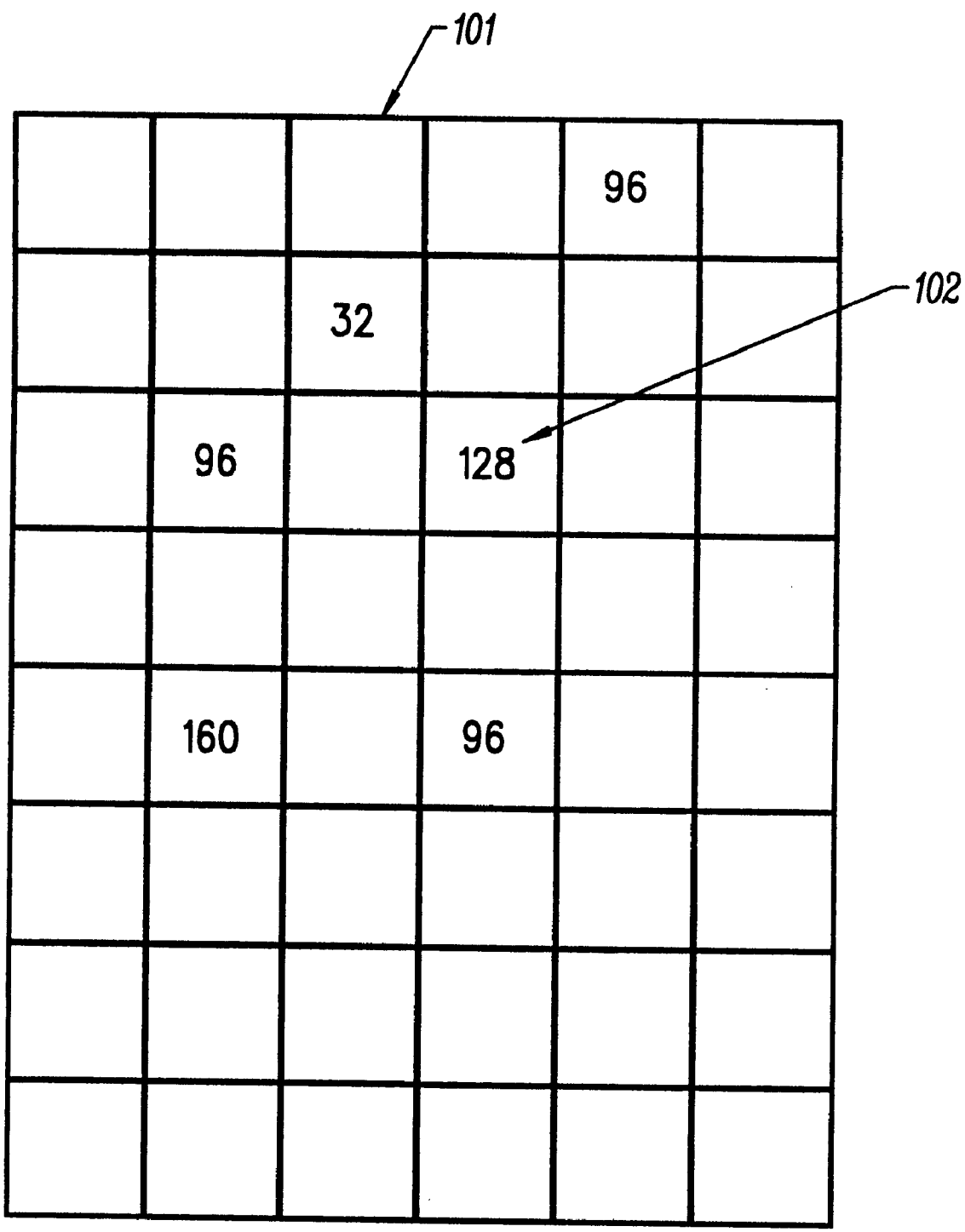
FIG. 1 is an illustration of a threshold array according to the invention.
Figure 2:
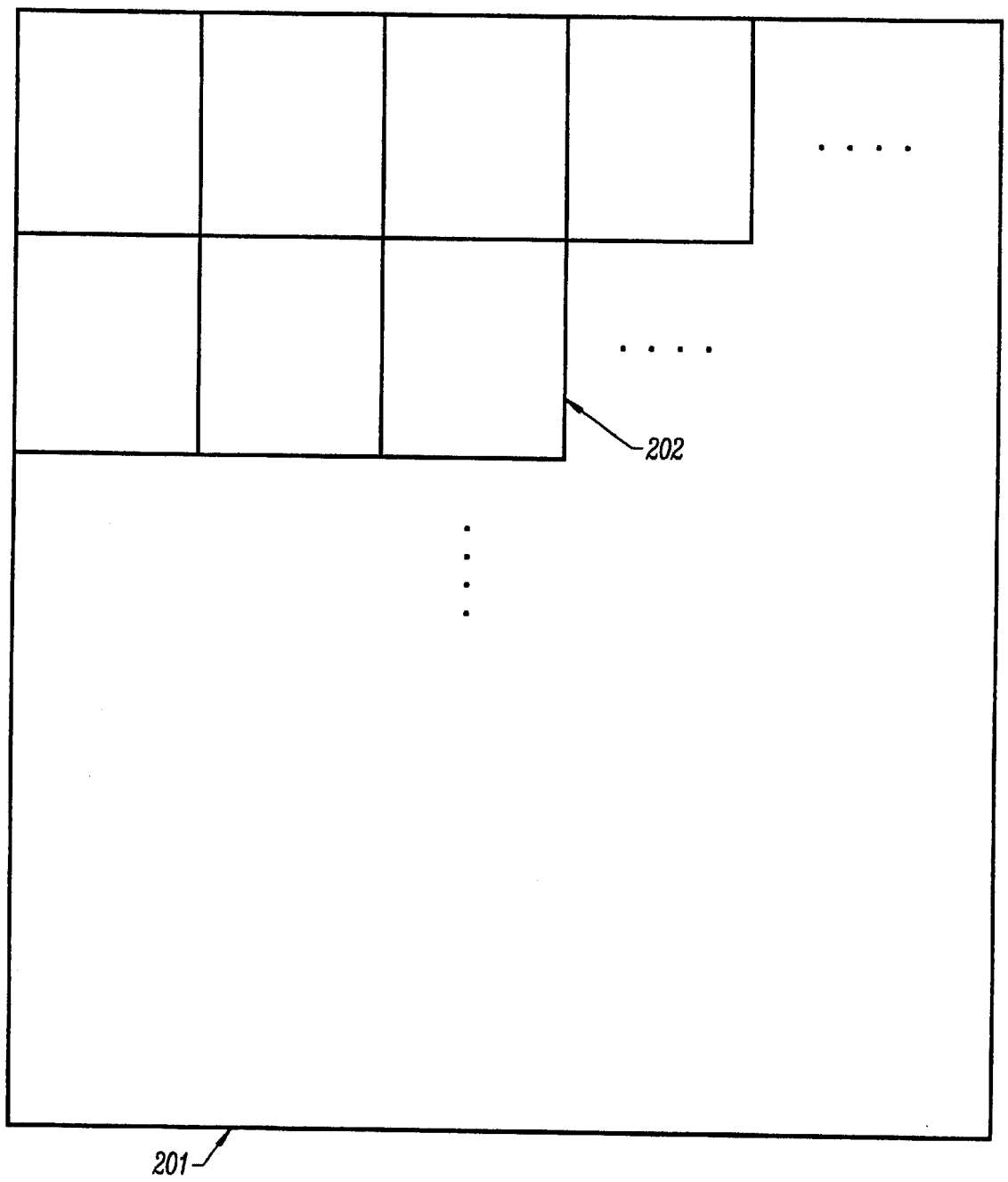
FIG. 2 is an illustration of a threshold array tiled over a device space according to the invention.

Referring to FIGS. 1 and 2, a threshold array 101 is shown as an array of numerical values 102. The values typically occupy eight bits each and range from 1 to 255, although any desired values may be used. The threshold array 202 is typically replicated and tiled over the entire device space 201, e.g. the surface of a display or a recording medium, such as paper. Each pixel of device space 201 is mapped to a particular element of the threshold array 202.

Figure 3:
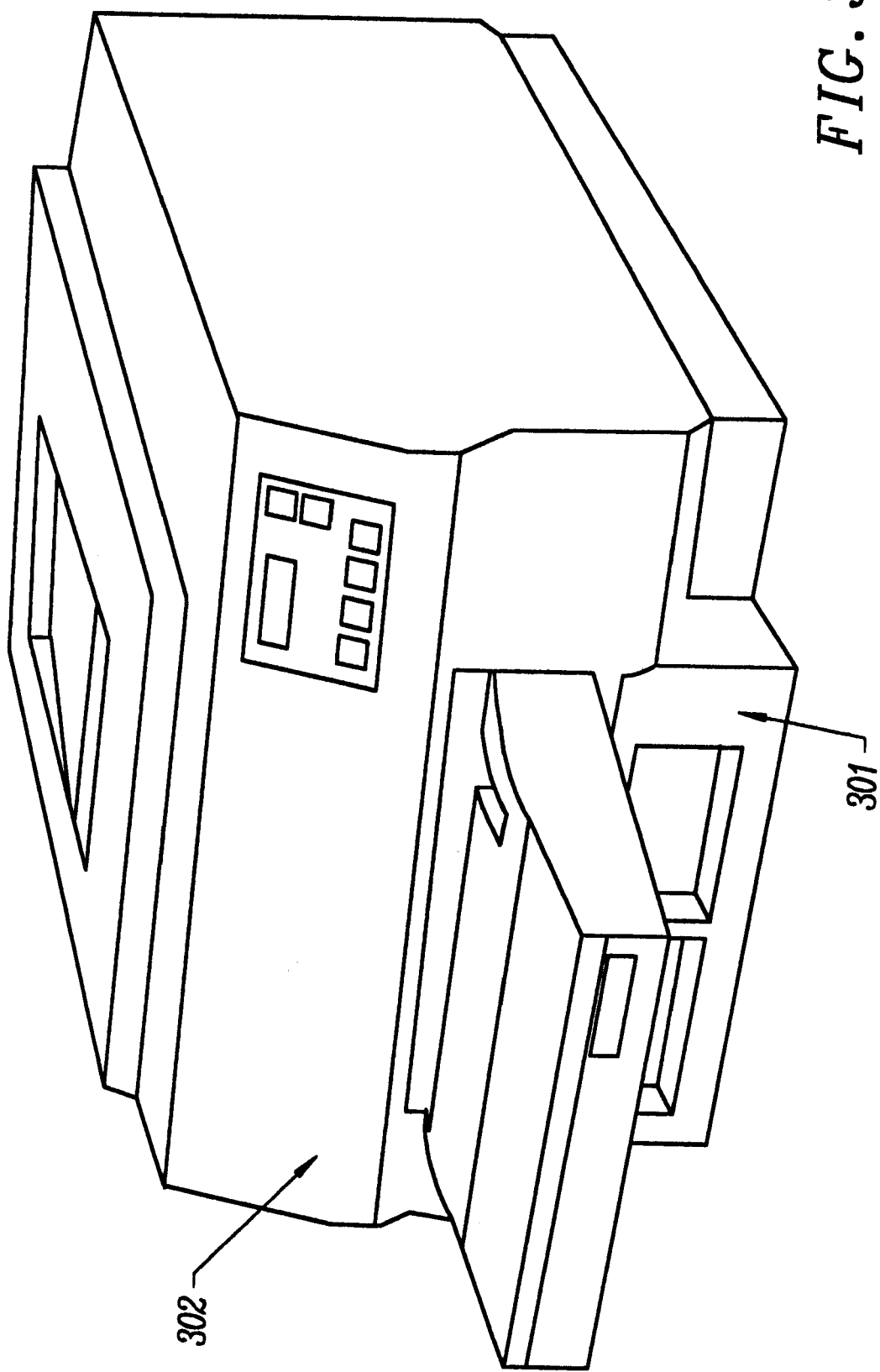
FIG. 3 is an illustration of an image according to the invention.

Turning to FIGS. 1 and 3, when deciding whether to turn the pixel on, the pixel's location 302 in the halftone image 301 is checked by determining the tonal value of the image at that exact location, which is then compared with the pixel's threshold value 102 in the threshold array 101. If the tonal value exceeds or equals the threshold value, the pixel is turned on when the image is created by the imaging system.

The invention operates during the creation of the threshold array. It examines each pixel that is a candidate to be turned on. Each location in this threshold array may be thought of as a pixel. The value at the location represents the order in which a corresponding pixel is to be turned on.

In the invention, a smoothing kernel K is used to determine a function Gi,j which approximates a perceived gray level for the desired gray level. The resultant equation is:

Variance
Let $$G(i, j) := \sum_p \sum_q b_{p,q} K((i-p)_{\mod N}, (j-q)_{\mod N})$$

$$\text{Var} := \sum_p \sum_q (G(p, q) - \overline{G})^2$$

K is smoothing Kernel, for example $K(i,j) = e^{-k\sqrt{i^2+j^2+ee}\,,\,rad}$;

$b_{p,q} = 1$ if previously selected pixel or candidate pixel;
0 otherwise;
$\overline{G}$ = average value of G(i,j).
Let $\text{Var}_{i,j}$ = Var where the candidate pixel is at location (i,j). The smoothing is doubly periodic.

Typically the parameter in k of K is adjusted to provide more smoothing when the minority pixels are further apart.

Figure 4:
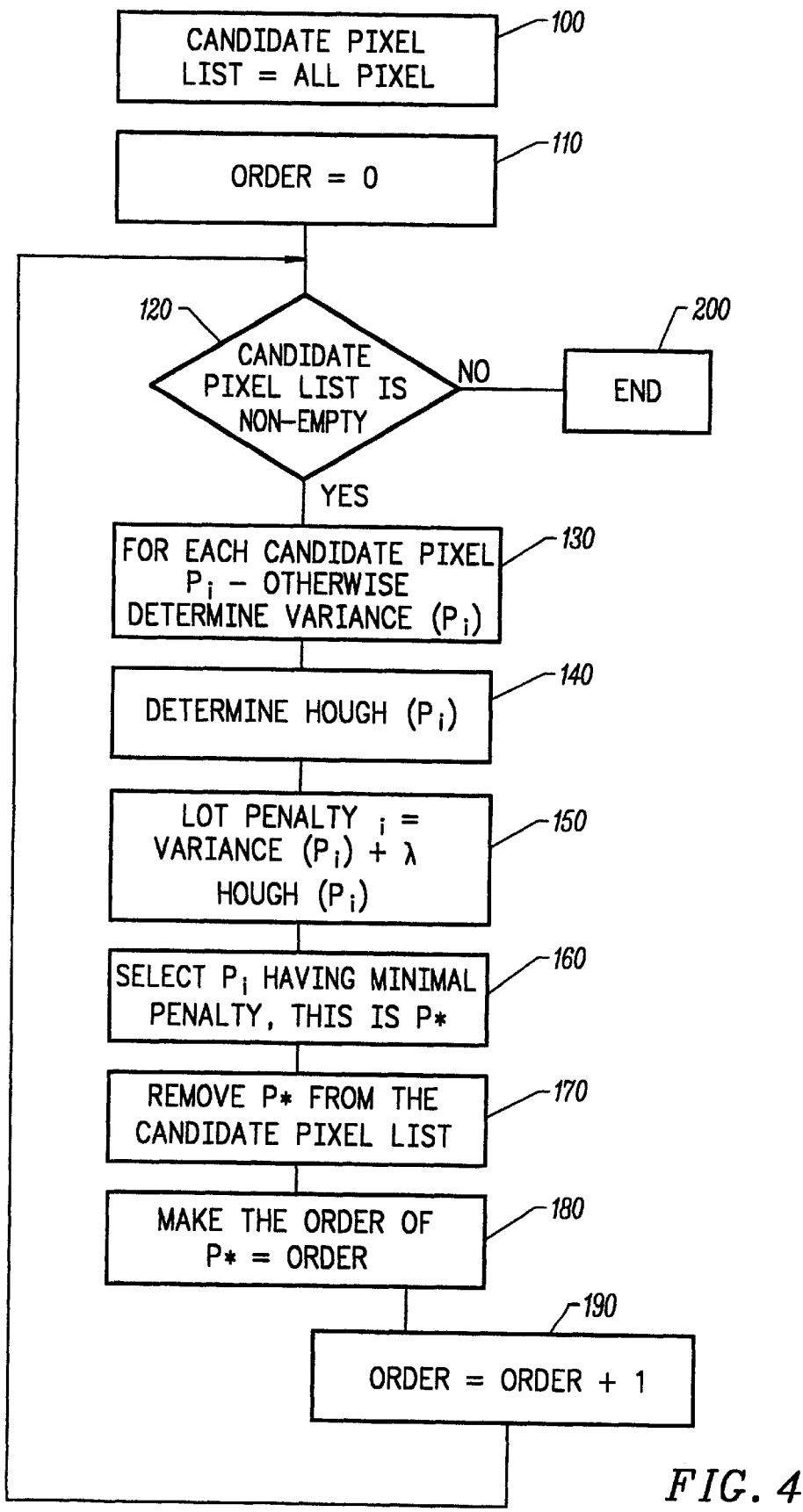
FIG. 4 is a data flow diagram of a candidate pixel evaluation according to the invention.

FIG. 4 is dataflow diagram of a candidate pixel evaluation according to the invention. The candidate list (100) consists of all pixels within a threshold array. The order of pixels is equal to 0 (110). While the candidate pixel list is not empty (120), for each candidate pixel $P_i$:

Determine the variance ($P_i$) (130);
Determine the Hough value ($P_i$) (e.g. Pixel collinearity) (140);
Make the penalty match the variance plus λ times Hough value, where λ is a subjectively selected parameter (150);
Select the $P_i$ that has minimal penalty P*(160);
Remove P* from the candidate pixel list (170);
Make the order of P* equal to the order (180); and
Make the order=order+1 (190).

Figure 5:
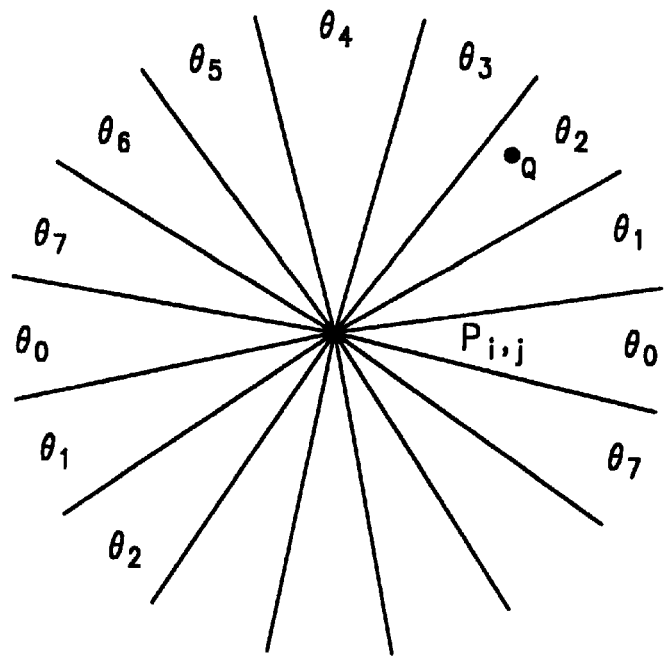
FIG. 5 is an illustration of a candidate pixel in relation to the distribution of angles it forms with a previously selected pixel according to the invention.

FIG. 5 is an illustration of a candidate pixel in relation to the distribution of angles it forms with the previously selected pixel according to the invention. In FIG. 5, a previously selected pixel Q is shown as well as a not yet selected pixel $P_{ij}$.

Figure 6:
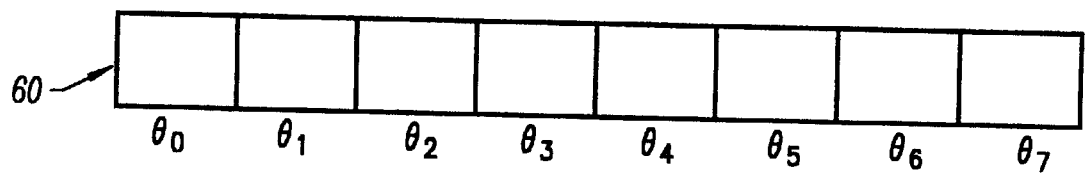
FIG. 6 is a illustration of an accumulator for a pixel P is according to the invention.

FIG. 6 an illustration of accumulator 60 for a pixel $P_{ij}$ according to the invention. There is an accumulator array for each not yet selected pixel (FIG. 5) that has a location for each of a quantized set of angles [I][j][k]. The accumulator for pixel $P_{ij}$ stores a sum based on those previously selected pixels which make an angle with the not yet selected pixel which is discretized to the angle corresponding to that location. Thus, Q (FIG. 5) contributes a value to the sum stored in the accumulator. It should be noted that the angles shown in FIG. 5 correspond to those shown in the accumulator of FIG. 6.

Figure 7:
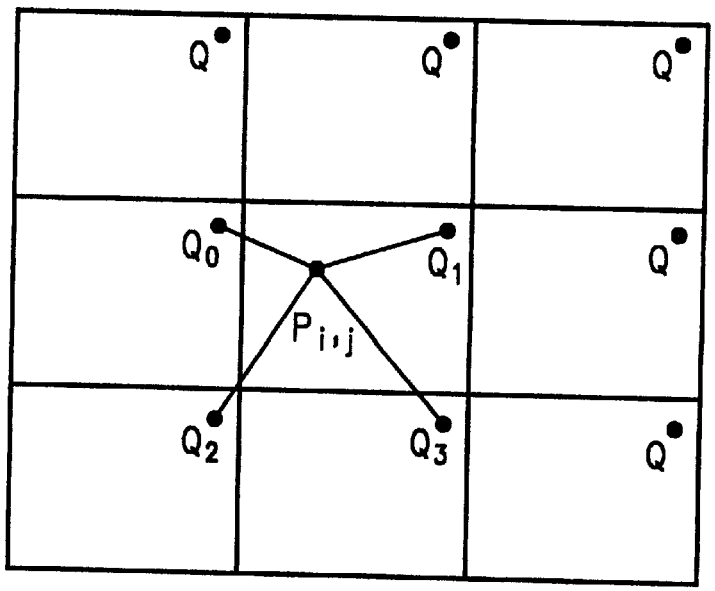
FIG. 7 is an illustration showing a candidate pixel within a threshold array being periodically tiled according to the invention.

FIG. 7 is an illustration showing a candidate pixel within a threshold array being periodically tiled according to the invention. When a point Q is selected, four points (e.g., $Q_0$, $Q_1$, $Q_2$, $Q_3$) are used to represent the relationship between Q and $P_{ij}$, where $P_{ij}$ is a not yet a selected point. These four points are the closest for periodic repeats of Q nearest to $P_{ij}$. It can be seen from FIG. 7, that the invention takes into account the fact that the angle between the candidate pixel and the previously selected pixel may be distributed over more than one location of the accumulator array and may depend on both distance and angle. For each point $Q_i$ (i=0,1,2,3), the values in the locations of the accumulate array are increased based on the angle and distance between $Q_i$ and $P_i$. The Hough penalty is a measure of how previously selected pixels line up with $P_{ij}$. In the present embodiment, the values in the accumulator array are averaged two at a time (periodically) and the maximum of the averaged values is used. It is desired that a pixel be selected which combines a low variance of the smooth gray level with a favorable distribution off values in its angle accumulator array. As set forth in connection with FIG. 4, this process is repeated with all pixels in a threshold array until all pixels in the threshold array have been selected.

Although the invention is described herein with reference to the preferred embodiment, one skilled in the art will readily appreciate that other applications may be substituted for those set forth herein without departing from the spirit and scope of the present invention. For example, although the invention is described as applying to an 8-bit gray scale, one skilled in the art can readily appreciate that these functions may applied to image data larger than 8 bits. Accordingly, the invention should only be limited by the claims included below.

What is claimed is:

1. Method for producing a threshold array, comprising the steps of:
   means for selecting a candidate pixel to be turned on in the threshold array;
   selecting a function representing the perceived binary pattern for a desired gray level;
   applying said binary function to said candidate pixel and all existing pixels in said threshold array to determine a variance between the value of each perceived pixel minus the average of all existing pixels;
   applying a pixel angle function to said candidate pixels and all previously selected pixels in said threshold array to determine a measure of collinearity with any other existing pixels; and
   turning said candidate pixel on if the sum of the variance and λ times the collinearity measure for said pixel is minimized, where λ is a parameter.

2. An apparatus for producing a threshold array, comprising:

means for selecting a candidate pixel to be turned on in the threshold array;

means for selecting a function representing the perceived binary pattern for a desired gray level;

means for applying said binary function to said candidate pixel and all existing pixels in said threshold array to determine a variance between the value of each perceived pixel minus the average of all existing pixels;

means for applying a pixel angle function to said candidate pixels and all previously selected pixels in said threshold array to determine a measure of collinearity with any other existing pixels; and means for turning said candidate pixel on if the sum of the variance and λ times the collinearity measure for said pixel is minimized, where λ is a parameter.

3. A method for creating a threshold array having a minimized gray scale variance, comprising the steps of:

processing each of a plurality of candidate pixels in said threshold array using a variance minimization technique; and applying a pixel angle calculation on said candidate pixel;

wherein said candidate pixel is examined to determine its effect on the variance of a smooth gray level determined by the convolution of a pixel pattern with a smoothing kernel.

4. The method of claim 3 further comprising the step of:

analyzing each pixel in said threshold array on a pixel by pixel basis.

5. The method of claim 3 wherein said candidate pixel is examined in relation to a distribution of angles it forms with previously processed pixels.

6. The method of claim 5 wherein said distribution of angles is determined using a variant combinational Hough transform.

7. The method of claim 3 further comprising the step of:

providing an accumulator array for each not-yet-processed pixel that has a location for each of a quantized set of angles.

8. The method of claim 7 further comprising the step of storing a sum in said accumulator array location based on those previously processed pixels which make an angle with said not-yet-processed pixel, wherein said not-yet-processed pixel is discretized to an angle corresponding to that location.

9. The method claim 8 wherein an effect of a true angle may be distributed over more than one location of said accumulator array and may depend upon distance and angle.

10. The method of claim 3 wherein a pixel is selected which combines a low variance of a smooth gray level with a favorable distribution of values in an angle accumulator array.

11. A apparatus for creating a threshold array having a minimized gray scale variance, comprising:

a threshold array in which each of a plurality of candidate pixels is processed using a variance minimization technique; and means for applying a pixel angle calculation on said candidate pixel;

wherein said candidate pixel is examined to determine its effect on the variance of a smooth gray level determined by the convolution of a pixel pattern with a smoothing kernel.

12. The apparatus of claim 11, further comprising:

mean for analyzing each pixel in said threshold array on a pixel by pixel basis.

13. The apparatus of claim 11 wherein said candidate pixel is examined in relation to a distribution of angles it forms with previously processed pixels.

14. The apparatus of claim 13 wherein said distribution of angles is determined using a variant combinational Hough transform.

15. The apparatus of claim 11 further comprising:

providing an accumulator array for each not-yet-processed pixel that has a location for each of a quantized set of angles.

16. The apparatus of claim 15 wherein a sum is stored in said accumulator array location based on those previously processed pixels which make an angle with said not-yet-processed pixel, wherein said not-yet-processed pixel is discretized to an angle corresponding to that location.

17. The apparatus claim 16 wherein an effect of a true angle may be distributed over more than one location of said accumulator array and may depend upon distance and angle.

18. The apparatus of claim 11 wherein a pixel is selected which combines a low variance of a smooth gray level with a favorable distribution of values in an angle accumulator array.

* * * * *